US012684488B2

(12) United States Patent
Hong

(10) Patent No.: US 12,684,488 B2
(45) Date of Patent: Jul. 14, 2026

(54) METHOD FOR TRANSMITTING INFORMATION, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 554 days.

(21) Appl. No.: 18/013,956

(22) PCT Filed: Jul. 30, 2020

(86) PCT No.: PCT/CN2020/105838
§ 371 (c)(1),
(2) Date: Dec. 30, 2022

(87) PCT Pub. No.: WO2022/021219
PCT Pub. Date: Feb. 3, 2022

(65) Prior Publication Data
US 2023/0292249 A1     Sep. 14, 2023

(51) Int. Cl.
*H04W 4/00* (2018.01)
*H04W 52/02* (2009.01)
*H04W 72/23* (2023.01)

(52) U.S. Cl.
CPC ......... *H04W 52/028* (2013.01); *H04W 72/23* (2023.01)

(58) Field of Classification Search
CPC ............................ H04W 52/028; H04W 72/23
See application file for complete search history.

(56) References Cited

U.S. PATENT DOCUMENTS

| 12,015,994 | B2* | 6/2024 | Xu | ......................... H04W 68/06 |
| 12,368,497 | B2* | 7/2025 | Rofougaran | ....... H04B 7/06954 |
| 2009/0047912 | A1* | 2/2009 | Lee | ......................... H04L 1/1671 |
| | | | | 455/69 |
| 2020/0146069 | A1 | 5/2020 | Chen et al. | |
| 2020/0374960 | A1* | 11/2020 | Deenoo | .................. H04W 76/19 |
| 2021/0144657 | A1* | 5/2021 | Ang | .................. H04W 52/0261 |
| 2021/0259013 | A1* | 8/2021 | Wong | ................... H04W 74/004 |
| 2021/0329508 | A1* | 10/2021 | Gopal | .................... H04W 76/15 |
| 2022/0167433 | A1* | 5/2022 | Tirronen | ........... H04W 74/0833 |
| 2022/0183054 | A1* | 6/2022 | Luo | ..................... H04W 72/542 |
| 2022/0248330 | A1* | 8/2022 | Jiang | ..................... H04L 5/0057 |

FOREIGN PATENT DOCUMENTS

| CN | 101094483 A | 12/2007 |
| CN | 101959292 A | 1/2011 |
| CN | 106961728 A | 7/2017 |

(Continued)

OTHER PUBLICATIONS

Chinese Patent Application No. 202080001705.9, Office Action dated Dec. 28, 2023, 5 pages.

(Continued)

*Primary Examiner* — Abdelnabi O Musa
(74) *Attorney, Agent, or Firm* — Cozen O'Connor

(57) ABSTRACT

A method for transmitting information, performed by an access network device, includes: sending an uplink indication information, the uplink indication information being configured to instruct UEs in a non-connected state to send a first uplink signal.

13 Claims, 6 Drawing Sheets

(56)         References Cited

FOREIGN PATENT DOCUMENTS

| CN | 110447296 A | 11/2019 |
| EP | 3506708 A1 | 7/2019 |

OTHER PUBLICATIONS

Chinese Patent Application No. 202080001705.9, English translation of Office Action dated Dec. 28, 2023, 5 pages.
Indian Patent Application No. 202247077204, Office Action dated Dec. 22, 2023, 7 pages.
European Patent Application No. 20947183.8 Search and Opinion dated Mar. 18, 2024, 7 pages.
PCT/CN2020/105838, English translation of International Search Report dated Apr. 25, 2021, 3 pages.

* cited by examiner access network
device

UE wireless communication

201: sending uplink indication information, the uplink
indication information being configured to instruct UEs in a
non-connected state to send a first uplink signal

METHOD FOR TRANSMITTING INFORMATION, COMMUNICATION DEVICE, AND STORAGE MEDIUM

CROSS-REFERENCE TO RELATED APPLICATION

This application is a national phase of International Application No. PCT/CN2020/105838 filed on Jul. 30, 2020, the entire content of which is incorporated herein by reference.

TECHNICAL FIELD

The disclosure relates to the field of wireless communication technology, in particular to a method for transmitting information, a communication device and a storage medium.

BACKGROUND

With the evolution of the standardization of the 5th Generation (5G) cellular mobile communication technology and rapid deployment of 5G networks, the industry has already started to research the 6G cellular mobile communication technology, and the key technology is air-space-ground-sea integration.

In a terrestrial cellular mobile communication system, the base station is powered by an external power source, and thus the chance of running out of power is low. In a cellular mobile communication system where satellites are used as access network devices, the satellites store energy with the solar energy, and thus the power is limited and there is an urgent need to solve the problem of how to save the power of the satellite, to ensure that the satellite cellular mobile communication system can keep working for a long time.

SUMMARY

According to a first aspect of the disclosure, a method for transmitting information, applied to an access network device, is provided. The method includes:

sending uplink indication information, the uplink indication information being configured to instruct UEs in a non-connected state to send a first uplink signal.

According to a second aspect of the disclosure, a method for transmitting information, applied to UEs in a non-connected state, is provided. The method includes:

receiving uplink indication information, the uplink indication information being configured to instruct the UEs in the non-connected state to send a first uplink signal.

According to a third aspect of the disclosure, a communication device is provided. The communication device includes:

a processor;

a memory coupled to the processor, in which the memory stores executable programs for transmitting information, when the executable programs are executed, the processor is caused to implement the method for transmitting information of the first aspect or the second aspect.

According to a fourth aspect of the disclosure, a storage medium having executable programs for transmitting information stored thereon is provided. When the executable programs are executed, a processor is caused to implement the method for transmitting information of the first aspect or the second aspect.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figures 1, 2:
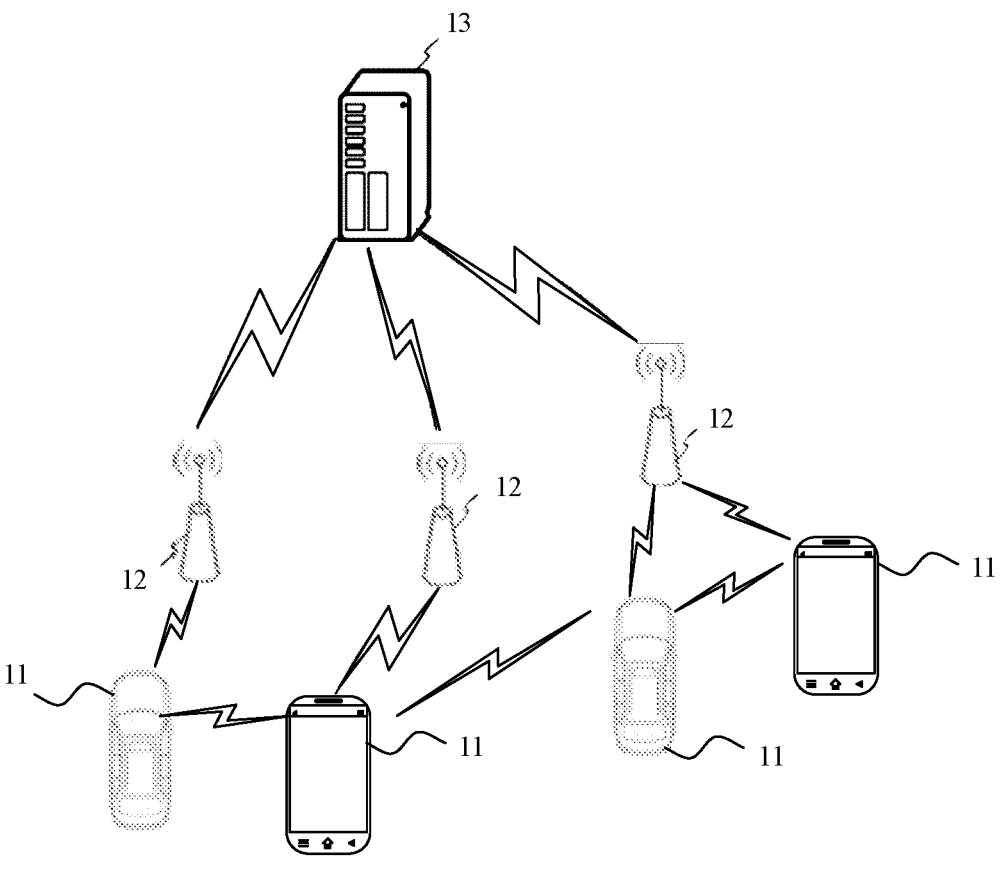
FIG. 1 is a schematic diagram of a wireless communication system according to an exemplary embodiment.
FIG. 2 is a flowchart of a method for transmitting information according to an exemplary embodiment.

FIG. 1 is a schematic diagram of a wireless communication system according to an exemplary embodiment. As shown in FIG. 1, the wireless communication system is a communication system based on the cellular mobile communication technology, and the wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a mobile phone (or "cellular" phone) and a computer with the IoT terminal. The terminal 11 may be a fixed, portable, pocket, hand-held, built-in computer or a vehicle-mounted device, such as, a Station (STA), a subscriber unit, a subscriber station, a mobile station, a mobile, a remote station, an access point, a remote terminal, an access terminal, a user terminal, a user agent, a user device, or a UE. Alternatively, the terminal 11 may also be an Unmanned Aerial Vehicle (UAV) device. Alternatively, the terminal 11 may also be a vehicle-mounted device, such as, an Engine Control Unit (ECU) with a wireless communication function, and a wireless communication device connected to the ECU. Alternatively, the terminal 11 may also be a roadside device, such as, a street light, a signal light, or other roadside devices with a wireless communication function.

The base station 12 may be a network-side device in a wireless communication system. The wireless communication system may be the 4th generation (4G) mobile communication system, also known as a Long Term Evolution (LTE) system. Alternatively, the wireless communication system may also be the 5th generation (5G) mobile communication system, also known as a New Radio (NR) system or 5G NR system. Alternatively, the wireless communication system may also be a next-generation system of the 5G system. The access network in the 5G system may be called New Generation-Radio Access Network (NG-RAN), or Machine Type Communication (MTC) system.

The base station 12 may be an evolved base station (eNB) in the 4G system. Alternatively, the base station 12 may also be a base station (gNB) that adopts a centralized distributed architecture in the 5G system. When the base station 12 adopts a centralized distributed architecture, it generally includes a Central Unit (CU) and at least two Distributed Units (DUs). The CU is provided with protocol stacks of a Packet Data Convergence Protocol (PDCP) layer, a Radio Link Control (RLC) layer, and a Media Access Control (MAC) layer. A physical (PHY) layer protocol stack is set in the DU, and the specific implementation manner of the base station 12 is not limited in this embodiment of the disclosure.

A wireless connection can be established between the base station 12 and the terminal 11 through a radio interface. In different embodiments, the radio interface is a radio interface based on the 4G standard. Alternatively, the radio interface is a radio interface based on the 5G standard, such as, a NR. Alternatively, the radio interface may also be a radio interface based on a next generation of the 5G standard.

In some embodiments, an End to End (E2E) connection may also be established between the terminals 11, for example, scenes of vehicle to vehicle (V2V) communication, Vehicle to Infrastructure (V2I) communication and Vehicle to Pedestrian (V2P) communication in a Vehicle to everything (V2X) communication.

In some embodiments, the above wireless communication system may further include a network management device 13.

A plurality of the base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in this embodiment of the disclosure.

The execution body involved in the embodiment of the disclosure includes, but is not limited to, UEs such as terminals supporting the cellular mobile communication, and the base stations.

The application scenario of the embodiment of the disclosure is a communication system in which the satellites are used as base stations for the cellular mobile communication, the satellites store energy with the solar energy, and thus the power is limited and there is an urgent need to solve the problem of how to save the power of the satellites, to ensure that the satellites can keep working for a long time.

This embodiment provides a method for transmitting information, which can be applied in the access network device in the mobile communication network. As shown in FIG. 2, the method includes the following steps.

At step 201, uplink indication information is transmitted, and the uplink indication information is configured to instruct UEs in a non-connected state to send a first uplink signal.

The UE may be, for example, a mobile phone terminal that uses the cellular mobile communication network technology for wireless communication. The access network device can be a mobile access network device. The mobile access network device may be a NTN base station for the cellular mobile communication network, such as a satellite, and a small base station carried by a high-altitude balloon. The uplink indication information can be sent by the access network device, which can be the satellite providing cellular mobile communication network coverage or the small base station carried by the high-altitude balloon.

The UE in the non-connected state may include a UE in an idle state or an inactive state. There is no Radio Resource Control (RRC) connection between the UE in the idle state and the base station and there is no RRC context of the UE stored on the base station, and the base station is not aware of the existence of the UE. The UE in the inactive state remains in a Connection Management-Connected (CM-Connected) state, the UE can move within the area configured by the access network device without notifying the access network device, and the last serving base station of the UE retains the RRC context of the UE.

Figure 3:
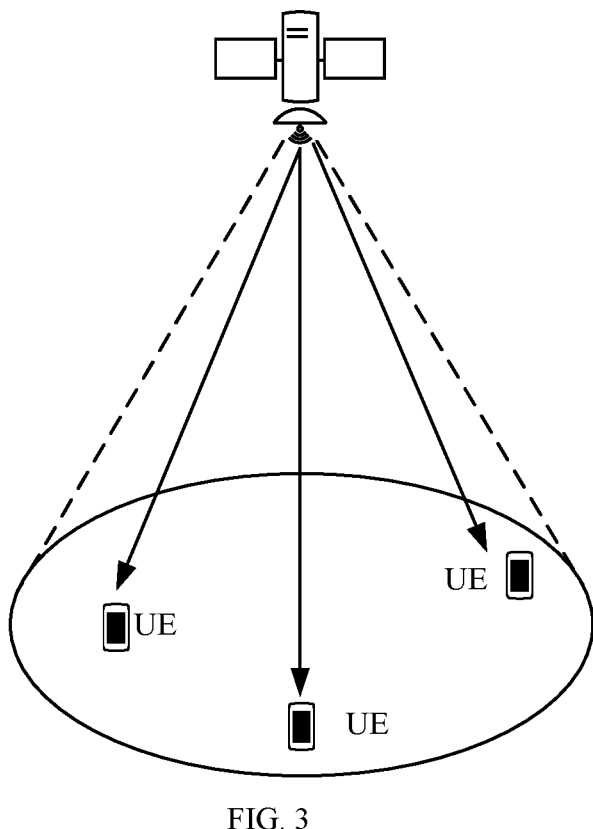
FIG. 3 is a schematic diagram of a Non-Terrestrial Network (NTN) signal coverage area according to an exemplary embodiment.

As shown in FIG. 3, the access network device, such as a NTN base station, can send the uplink indication information by broadcasting. Alternatively, the uplink indication information can be carried in a Physical Downlink Control Channel (PDCCH) signaling and listened by the UEs. The UEs in the connected state may ignore the uplink indication information, and the UEs in the non-connected state may respond to the uplink indication information based on an agreement, a communication protocol or an instruction from the access network device. The UEs may be UEs within the signal coverage area of the access network device.

The access network device, such as the NTN base station, may send the uplink indication information when it is currently connected to the UE in the connected state, or when it isn't connected to the UE in the connected state currently.

The first uplink signal may be a response signal corresponding to the uplink indication information. The first uplink signal may be a newly defined signal configured to respond to the uplink indication information. The first uplink signal may also be an existing uplink signal, for example, the Msg1 during the random access process. The first uplink signal may carry the identification information of the UE for indicating to transmit the first uplink signal.

When the uplink indication information is received, the UE may transmit the first uplink signal. The access network device, such as the NTN base station, may determine whether there is any UE in the non-connected state within the signal coverage area based on the first uplink signal received, and/or, determine the number of UEs in the non-connected state within the signal coverage area of the access network device based on the first uplink signal received.

The access network device determines the status of the UEs in the non-connected state within the signal coverage area, and adjusts its own load accordingly. For example, when the first uplink signal returned is not received, the access network device may determine that there is no UE in the non-connected state within the signal coverage area, and turn off a part of RF resources and retain only the necessary RF resources, to save power. The RF resources may be device resources for RF signal reception and processing and/or processor computing and processing resources.

In this way, the access network device can determine whether there is any UE in the non-connected state within the signal coverage area by sending the uplink indication information for instructing the UEs in the non-connected state to send the first uplink signal. The access network device can determine the status of the UEs in the non-connected state within the signal coverage area accurately and adjust its own load based on the status of the UEs, thereby improving the accuracy of adjusting the load of the access network device.

Figure 4:
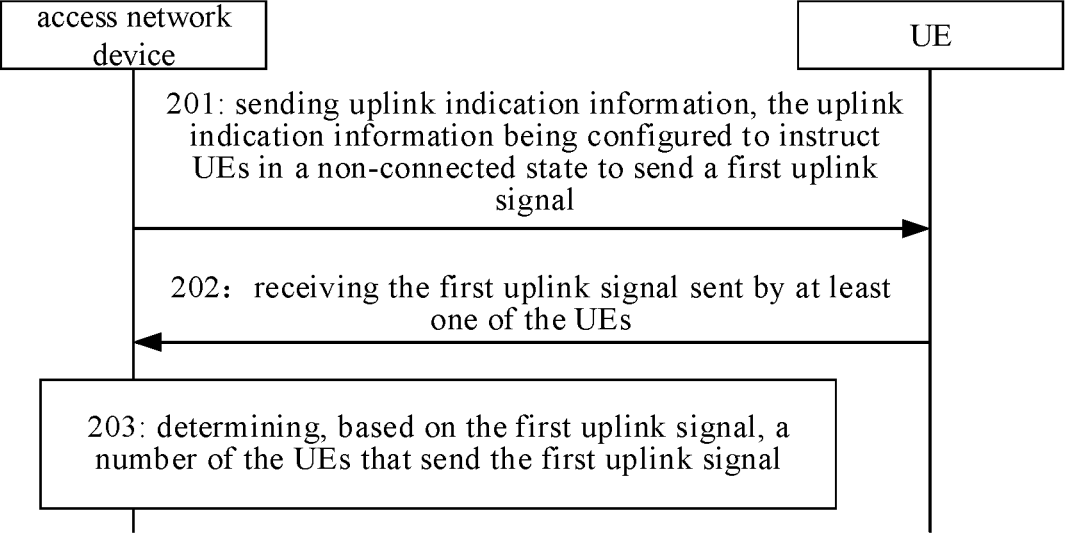
FIG. 4 is another flowchart of the method for transmitting information according to an exemplary embodiment.

In an embodiment, as shown in FIG. 4, the method further includes the following steps.

At step 202, the first uplink signal sent by at least one of the UEs is received.

At step 203, based on the first uplink signal, a number of the UEs that send the first uplink signal is determined.

After the uplink indication information is received, the UEs may transmit the first uplink signal. Each of the UEs may carry its own identifier in the first uplink signal.

The access network device, such as the NTN base station, may determine the number of UEs in the non-connected state within the signal coverage area of the access network device based on the first uplink signal received.

In this way, the access network device can determine the number of the UEs in the non-connected state within the signal coverage area accurately, and adjust its own load with reference to the number, thereby improving the accuracy of adjusting the load of the access network device.

In an embodiment, the method further includes:
    switching an operating mode of the access network device based on the number of the UEs that send the first uplink signal, in which different operating modes are with different power consumptions.

The access network device can establish different numbers of communication connections in different operating modes. The signal coverage areas of the access network device in different operating modes may be different. For example, the RF resources adopted for different operating modes are different.

For example, the number of antennas or the number of antenna units in a row of antennas used by the access network device may be different for different operating modes. The signals transmitted by different number of antennas or different number of antenna units in a row can cover different areas, and the numbers of involved UEs are different for different operating modes. Different number of antennas or different number of antenna units in a row are with different power consumptions.

In an embodiment, switching the operating mode of the access network device based on the number of the UEs that send the first uplink signal includes at least one of:
    switching from a first operating mode to a second operating mode, in response to determining the number of the UEs that send the first uplink signal being less than a threshold value; or
    switching from the second operating mode to the first operating mode, in response to determining the number of the UEs that send the first uplink signal being greater than or equal to a threshold value;
    in which a power consumption of the access network device in the first operating mode is greater than a power consumption of the access network device in the second operating mode.

The threshold value may be determined based on the number of supported UEs of the access network device in each operating mode. When the access network device is operating in the first operating mode, the number of supported UEs is greater than or equal to the threshold value. When the access network device is operating in the second operating mode, the number of supported UEs is less than the threshold value.

The resource required for the first operating mode may be greater than the resource required for the second operating mode. For example, the RF resources required for the first operating mode may be greater than the RF resources required for the second operating mode. The RF resources may include: a number of antennas or antenna units, and resources for filtering and signal amplification in the RF path. For example, more RF resources may be turned off in the second operating mode compared to the first operating mode. The second operating mode may also be an operating mode with the RF resources turned off.

When the access network device is in the first operating mode and the number of UEs in the non-connected state within the signal coverage area of the access network device is determined to be less than the threshold value based on the first uplink signal received, it can be predicted that there will be an excess of resources in the first operating mode, and the access network device can switch to the second operating mode, so that the power consumption of the access network device can be saved.

When the access network device is in the second operating mode and the number of UEs in the non-connected state within the signal coverage area of the access network device is determined to be greater than or equal to the threshold value based on the first uplink signal received, it is possible to predict a shortage of resources in the second operating mode, at which point, the access network device can switch to the first operating mode. In this way, the demand of the UE for the resources of the access network device can be satisfied and the quality of communication can be ensured.

In an embodiment, receiving the first uplink signal sent by the at least one of the UEs in the non-connected state, includes:

receiving a message Msg1 in a random access process.

The UE transmits the first uplink signal by using the existing Msg1 in the random access process. A special identifier can be carried in the Msg1 to respond to the uplink indication information. The access network device may not initiate the random access process for the Msg1 in response to the uplink indication information. In this way, the existing signaling transmission resources can be used to transmit the first uplink signal without reconfiguring a new transmission process, thereby reducing the complexity of the communication.

The UE can also define a new first uplink signal, so as to reduce the impact on the existing communication transmission process.

In an embodiment, sending the uplink indication information includes at least one of:

broadcasting a system message carrying the uplink indication information;

sending Downlink Control Information DCI carrying a short message indicating a reserved code that indicates the uplink indication information; or sending DCI carrying a short message with a reserved bit that indicates the uplink indication information.

The access network device can carry the uplink indication information in a system message to notify the UE, and the uplink indication information can be carried in a reserved bit in the existing system message. It is also possible to configure a new system message to carry the uplink indication information. If the new system message is used to carry the uplink indication information, the access network device may notify the UEs within the signal coverage area to read the new system message by setting the first bit of the short message in the DCI to "1". When the new system message is received, the UE transmits the first uplink signal to the access network device as required.

A short message indicator is set in the DCI in which Cyclic Redundancy Check (CRC) is scrambled by Paging-Radio Network Temporary Identity (P-RNTI). The short message indicator occupies two bits, and the indicator indicates different configuration conditions of the paging message and the short message carried in the DCI with different encodings. It is possible to encode and carry the uplink indication information in undefined bits in the short message indicator.

For example, as shown in Table 1, the short message indicator occupies two bits and uses different encodings to indicate different contents. For example, "00" can be used to carry the uplink indication information. When the UE parses the short message indicator to "00", it is determined that the uplink indication information is received.

TABLE 1

| encoding | indication information |
| --- | --- |
| 00 | reserved |
| 01 | Only the scheduling information including the paging message is set in the DCI |
| 10 | Only the short message is set in the DCI |
| 11 | Only the scheduling information including the paging message and the short message are set in the DCI |

The DCI carries the short message, which can be used to indicate the change of information in the communication system and indicate to stop listening the paging message.

The short message can be used to carry the uplink indication information, and the short message can be obtained by parsing the content of the DCI after the DCI is received, and then the uplink indication information in the short message can be determined. The reserved bit in the short message can be used to carry the uplink indication information.

When the UE listens the downlink communication of the base station, it first listens the downlink DCI that uses the PDCCH resource. When the DCI carries the uplink indication information, the UE can obtain the uplink indication information after parsing the DCI. The UE can send the first uplink signal after the uplink indication information is received.

For example, the short message occupies 8 bits, in which the first to third bits are used to indicate the change of information in the communication system and to indicate to stop listening the paging message.

One or more bits of the fourth to eighth bits may be used to indicate the uplink indication information.

In an embodiment, sending the uplink indication information, includes:

in response to the access network device not being connected to a UE in a connected state, sending the uplink indication information.

The access network device may send the uplink indication information when no UE in the connected state is connected to the access network device, and determines the UEs in the non-connected state.

When the access network device is not connected to any UE in the connected state, the access network device can turn off unnecessary resources regardless of limitations of the communication currently in progress, thereby saving the power consumption.

In an embodiment, sending the uplink indication information, includes:

in response to the access network device being located in a preset area, sending the uplink indication information.

The preset area can be an area where the access network device cannot obtain sufficient power or an area with a small number of UEs.

For example, the satellite may send the uplink indication information after approaching an area without sunlight and switch the operating mode to save the power consumption.

The satellite may also send the uplink indication information after reaching a specific sea area and switch the operating mode to save the power consumption.

In an embodiment, the method further includes at one of:

sending a signaling carrying a transmission resource configuration for the first uplink signal; and broadcasting a system message carrying the transmission resource configuration for the first uplink signal.

The transmission resource of the first uplink signal may include, for example, encoding resources, time domain resources, frequency domain resources and/or space domain resources for the UE to transmit the first uplink signal.

The access network device may carry the transmission resource configuration for the first uplink signal in a downlink signaling to the UE or carry the transmission resource configuration for the first uplink signal in a system message to the UE.

The UE can transmit the first uplink signal on the resource configured based on the transmission resource configuration. In this way, the reliability of the transmission of the first uplink signal can be guaranteed.

Figure 5:
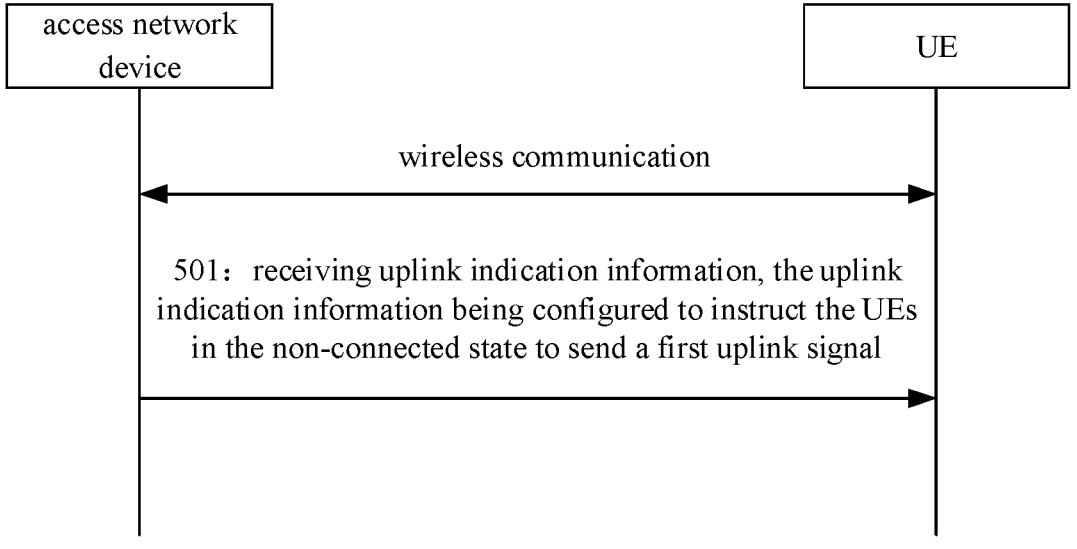
FIG. 5 is a flowchart of another method for transmitting information according to an exemplary embodiment.

This embodiment provides a method for transmitting information, applied to UEs in the mobile communication network. As shown in FIG. 5, the method includes the following steps.

At step 501, the uplink indication information is received, and the uplink indication information is configured to instruct the UEs in the non-connected state to send a first uplink signal.

The UE may be a mobile phone terminal that uses the cellular mobile network technology for wireless communication. The access network device may be a mobile access network device. The mobile access network device may be the NTN base station of the cellular mobile communication network, such as a satellite and a small base station carried by a high-altitude balloon. The uplink indication information can be sent by the access network device such as the satellite providing cellular mobile communication network coverage or the small base station carried by the high altitude balloon.

The UEs in the non-connected state may include UEs in the idle state or inactive state. There is no RRC connection between the UE in the idle state and the base station and no RRC context of the UE stored on the base station, and the base station is not aware of the existence of the UE. The UE in the inactive state remains in a CM-Connected state, the UE can move within the area configured by the access network without notifying the access network, and the last serving base station of the UE retains the RRC context of the UE.

As shown in FIG. 3, the access network device, such as the NTN base station, may send the uplink indication information by broadcasting. Alternatively, the uplink indication information can be carried in a PDCCH signaling and listened by the UEs. The UEs in the connected state may ignore the uplink indication information, and the UEs in the non-connected state may respond to the uplink indication information based on an agreement, a communication protocol or an instruction from the access network device.

The access network device, such as the NTN base station, may send the uplink indication information when it is currently connected to the UE in the connected state, or when it isn't connected to the UE in the connected state currently.

The first uplink signal may be a response signal to the uplink indication information. The first uplink signal may be a newly defined signal for responding to the uplink indication information. The first uplink signal may also be an existing uplink signal, for example, the Msg1 during the random access process. The first uplink signal may carry the identification information of the UE for indicating the UE to transmit the first uplink signal.

After the uplink indication information is received, the UE sends the first uplink signal. The access network device such as the NTN base station may determine whether there is any UE in the non-connected state within the signal coverage area based on the first uplink signal received, and/or, determine the number of UEs in the non-connected state within the signal coverage area of the access network device based on the number of first uplink signals received.

The access network device can determine the status of the UEs in the non-connected state within the signal coverage area and adjust its own load based on the status. For example, when the access network device does not receive the first uplink signal returned, it can be determined that there is no UE in the non-connected state within the signal coverage area, and then part of the RF resources can be turned off and only the necessary RF resources are retained for saving the power. The RF resources may be device resources for RF signal reception and processing and/or processor computing and processing resources for the access network device.

In this way, the access network device can determine whether there is any UE in the non-connected state within the signal coverage area by sending the uplink indication information for instructing the UEs in the non-connected state to send the first uplink signal. The access network device can determine the status of the UEs in the non-connected state within the signal coverage area accurately and adjust its own load based on the status, thereby improving the accuracy of adjusting the load of the access network device.

Figure 6:
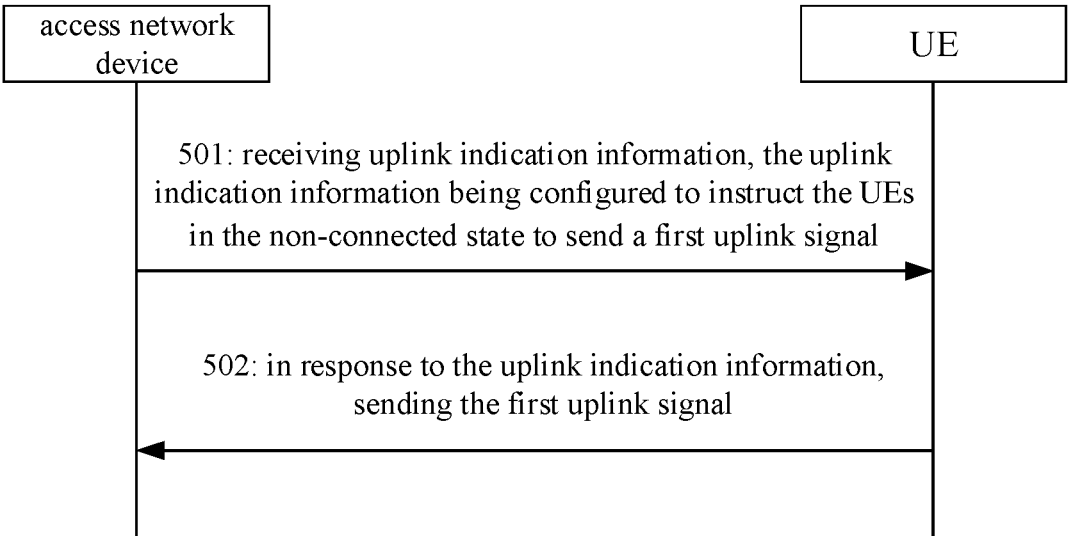
FIG. 6 is another flowchart of the method for transmitting information according to an exemplary embodiment.

In an embodiment, as shown in FIG. 6, the method further includes the following steps.

At step 502, in response to the uplink indication information, the first uplink signal is sent.

After the uplink indication information is received, the UEs can send the first uplink signal. Each of the UEs may carry its own identifier in the first uplink signal.

The access network device such as the NTN base station may determine the number of UEs in the non-connected state within the signal coverage area of the access network device based on the first uplink signal received.

In this way, the access network device can accurately determine the number of UEs in the non-connected state within the signal coverage area, and adjust its own load based on the number, thereby improving the accuracy of adjusting the load.

In an embodiment, sending the first uplink signal includes: sending a message Msg1 in a random access process.

The UE transmits the first uplink signal by using the existing Msg1 in the random access process. A special identifier can be carried in the Msg1 to respond to the uplink indication information. The access network device may not initiate the random access process for the Msg1 in response to the uplink indication information. In this way, the existing signaling transmission resources can be used to transmit the first uplink signal without reconfiguring a new transmission process, thereby reducing the complexity of the communication.

The UE can also define a new first uplink signal, so as to reduce the impact on the existing communication transmission process.

In an embodiment, the method further includes at least one of:

receiving a signaling carrying a transmission resource configuration for the first uplink signal; or
  receiving a system message carrying the transmission resource configuration for the first uplink signal;
  in which sending the first uplink signal includes:
  sending the first uplink signal on a transmission resource configured based on the transmission resource configuration.

The transmission resource of the first uplink signal may include, for example, encoding resources, time domain resources, frequency domain resources and/or space domain resources for the UE to transmit the first uplink signal.

The access network device may carry the transmission resource configuration for the first uplink signal in a downlink signaling to the UE or carry the transmission resource configuration for the first uplink signal in a system message to the UE.

The UE can transmit the first uplink signal on the resource configured based on the transmission resource configuration.

In this way, the reliability of the transmission of the first uplink signal can be guaranteed.

In an embodiment, receiving the uplink indication information includes at least one of:

receiving a system message carrying the uplink indication information;

receiving Downlink Control Information DCI carrying a short message indicating a reserved code that indicates the uplink indication information; or receiving DCI carrying a short message with a reserved bit that indicates the uplink indication information.

The access network device can carry the uplink indication information in a system message to notify the UE, and the uplink indication information can be carried in a reserved bit in the existing system message. It is also possible to configure a new system message to carry the uplink indication information. If the new system message is used to carry the uplink indication information, the access network device may notify the UEs within the signal coverage area to read the new system message by setting the first bit of the short message in the DCI to "1". When the new system message is received, the UE transmits the first uplink signal to the access network device as required.

A short message indicator is set in the DCI in which the CRC is scrambled by the P-RNTI. The short message indicator occupies two bits, and the short message indicator indicates different configuration conditions of the paging message and the short message carried in the DCI with different encodings. It is possible to encode and carry the uplink indication information using undefined bits in the short message indicator.

For example, as shown in Table 1, the short message indicator occupies two bits and uses different encodings to indicate different contents. For example, "00" can be used to carry the uplink indication information. When the UE parses the short message indicator to "00", it is determined that the uplink indication information is received.

The DCI carries the short message, which can be used to indicate the change of information in the communication system and indicate to stop listening the paging message. The short message can be used to carry the uplink indication information, and the short message can be obtained by parsing the content of the DCI after the DCI is received, and then the uplink indication information in the short message can be determined. The reserved bit in the short message can be used to carry the uplink indication information.

When the UE listens the downlink communication of the base station, it first listens the downlink DCI that uses the PDCCH resource. When the DCI carries the uplink indication information, the UE can obtain the uplink indication information after parsing the DCI. The UE can send the first uplink signal after the uplink indication information is received.

For example, the short message occupies 8 bits, in which the first to third bits are used to indicate the change of information in the communication system and to indicate to stop listening the paging message.

One or more bits of the fourth to eighth bits may be used to indicate the uplink indication information.

A specific example is provided below in combination with any of the above embodiments.

The disclosure provides a method for saving a power during a satellite communication.

1. A satellite/base station may notify the satellite terminals in the non-connected state (idle or inactive state) within its signal coverage area to send an uplink signal.

(1) The satellite/base station can notify the satellite terminals in the non-connected state within its signal coverage area to send the uplink signal when there is no terminal in the connected state within its signal coverage area.

2. The satellite/base station can notify the terminals by broadcasting a new system message. After broadcasting the system message, the satellite/base station notifies the terminals within its signal coverage area to read the new system message by setting the first bit of the short message to "1". After the new system message is received, the terminal sends the uplink signal to the satellites as required.

3. The satellite/base station can notify the terminals within its signal coverage area to transmit the uplink signal by setting the short message indicator to "00". The information indicated by the bit encodings in the short message indicator is shown in Table 1.

4. The satellite/base station can notify the terminals within its signal coverage area to transmit the uplink signal by configuring "1" in any of bits 4 to 8 of the short message or by configuring combinations of multiple bits.

5. After the message for indicating to send the uplink signal is received from the satellite/base station, the satellite terminals send the uplink signal to the satellite as required.

(1) The resources for sending the uplink signal include: encoding resources, time domain resources, frequency domain resources and/or space domain resources. The resources can be pre-configured by the base station or configured by the base station by broadcasting the message.

(2) The uplink signal can be sent by sending the Msg1 using the existing random access mechanism or by defining a new uplink signal.

6. The satellite/base station can turn on a power saving function after reaching a specific area.

(1) The satellite can turn on the power saving function after reaching an area without sunlight.

(2) The satellite can turn on the power saving function after reaching a specific sea area.

7. After receiving the uplink signal, the base station can determine the terminals in the non-connected state within the signal coverage area. If the number of terminals in the non-connected state is less than the threshold value, the base station can start a power saving mode, and some or all resources can be turned off in the power saving mode. The relevant resources can include the RF resources, and the RF resources can be device resources or computing resources used to process RF signals for the base station.

Figure 7:
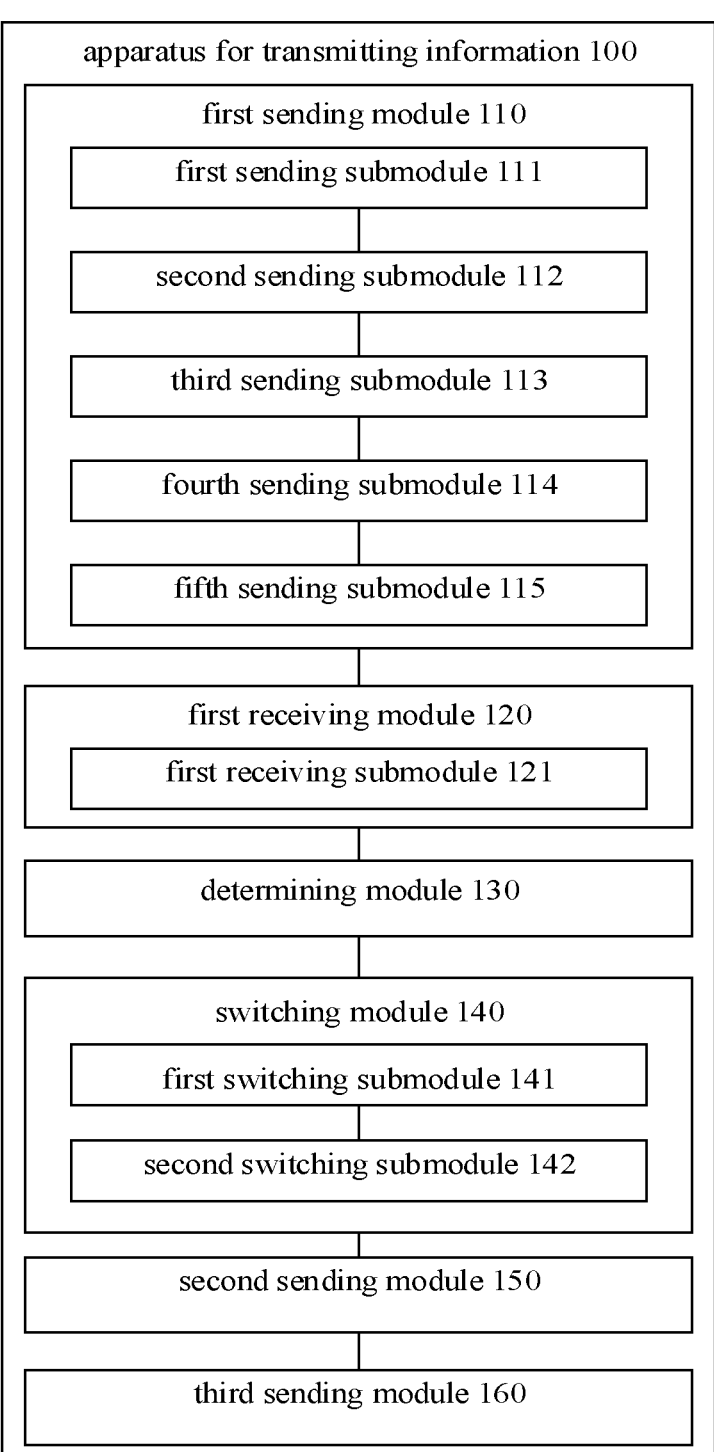
FIG. 7 is a block diagram of an apparatus for transmitting information according to an exemplary embodiment.

The embodiment of the disclosure also provides an apparatus for transmitting information, applied to an access network device. FIG. 7 is a schematic diagram of an apparatus for transmitting information 100 according to an embodiment of the disclosure. As shown in FIG. 7, the apparatus 100 includes: a first sending module 110.

The first sending module 110 is configured to send uplink indication information, the uplink indication information is configured to instruct UEs in a non-connected state to send a first uplink signal.

In an embodiment, the apparatus 100 includes: a first receiving module 120 and a determining module 130.

The first receiving module 120 is configured to receive the first uplink signal sent by at least one of the UEs.

The determining module 130 is configured to determine, based on the first uplink signal, a number of the UEs that send the first uplink signal.

In an embodiment, the apparatus 100 includes: a switching module 140.

The switching module 140 is configured to switch an operating mode of the access network device based on the number of the UEs that send the first uplink signal, in which different operating modes are with different power consumptions.

In an embodiment, the switching module 140 includes at least one of: a first switching submodule 141 or a second switching submodule 142.

The first switching submodule 141 is configured to switch from a first operating mode to a second operating mode, in response to determining the number of the UEs that send the first uplink signal being less than a threshold value.

The second switching submodule 142 is configured to switch from the second operating mode to the first operating mode, in response to determining the number of the UEs that send the first uplink signal being greater than or equal to the threshold value.

A power consumption of the access network device in the first operating mode is greater than a power consumption of the access network device in the second operating mode.

In an embodiment, the first receiving module 120 includes at least one of: a first receiving submodule 121.

The first receiving submodule 121 is configured to receive a message Msg1 in a random access process.

In an embodiment, the first sending module 110 includes at least one of: a first sending submodule 111, a second sending submodule 112 or a third sending submodule 113.

The first sending submodule 111 is configured to broadcast a system message carrying the uplink indication information.

The second sending submodule 112 is configured to send Downlink Control Information DCI carrying a short message indicating a reserved code that indicates the uplink indication information.

The third sending submodule 113 is configured to send DCI carrying a short message with a reserved bit that indicates the uplink indication information.

In an embodiment, the first sending module 110 includes: a fourth sending submodule 114.

The fourth sending submodule 114 is configured to, in response to the access network device not being connected to a UE in a connected state, send the uplink indication information.

In an embodiment, the first sending module 110 includes: a fifth sending submodule 115.

The fifth sending submodule 115 is configured to, in response to the access network device being located in a preset area, send the uplink indication information.

In an embodiment, the apparatus 100 further includes at least one of: a second sending module 150 or a third sending module 160.

The second sending module 150 is configured to send a signaling carrying a transmission resource configuration for the first uplink signal.

The third sending module 160 is configured to broadcast a system message carrying the transmission resource configuration for the first uplink signal.

Figure 8:
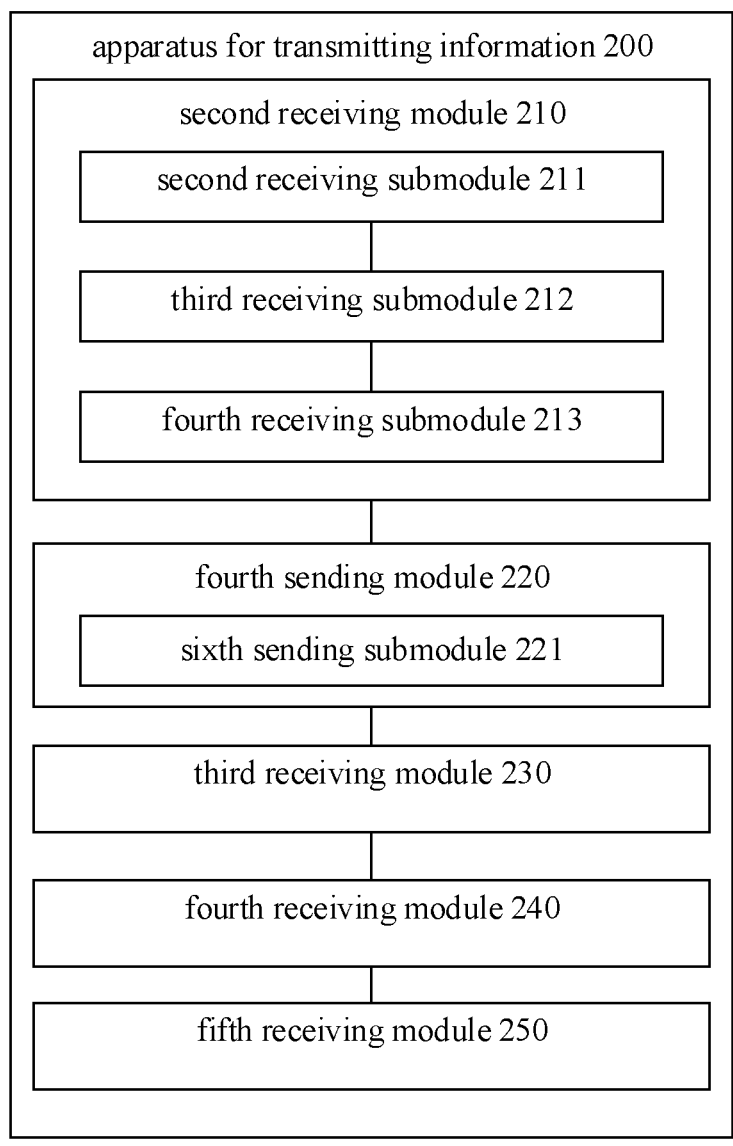
FIG. 8 is a block diagram of another apparatus for transmitting information according to an exemplary embodiment.

The embodiment of the disclosure also provides an apparatus for transmitting information, applied to UEs. FIG. 8 is a schematic diagram of an apparatus for transmitting information 200 according to an embodiment of the disclosure. As shown in FIG. 8, the apparatus 200 includes: a second receiving module 210.

The second receiving module 210 is configured to receive uplink indication information, and the uplink indication information is configured to instruct the UEs in the non-connected state to send a first uplink signal.

In an embodiment, the apparatus 200 includes: a fourth sending module 220.

The fourth sending module 220 is configured to, in response to the uplink indication information, send the first uplink signal.

In an embodiment, the fourth sending module 220 includes: a sixth sending submodule 221.

The sixth sending submodule 221 is configured to send a message Msg1 in a random access process.

In an embodiment, the apparatus 200 includes at least one of: a third receiving module 230, a fourth receiving module 240 or a fifth receiving module 250.

The third receiving module 230 is configured to receive a signaling carrying a transmission resource configuration for the first uplink signal.

The fourth receiving module 240 is configured to receive a system message carrying the transmission resource configuration for the first uplink signal.

The fifth receiving module 250 is configured to send the first uplink signal, in which sending the first uplink signal includes:

sending the first uplink signal on a transmission resource configured based on the transmission resource configuration.

In an embodiment, the second receiving module 210 includes at least one of: a second receiving submodule 211, a third receiving submodule 212 or a fourth receiving submodule 213.

The second receiving submodule 211 is configured to receive a system message carrying the uplink indication information.

The third receiving submodule 212 is configured to receive Downlink Control Information DCI carrying a short message indicating a reserved code that indicates the uplink indication information.

The fourth receiving submodule 213 is configured to receive DCI carrying a short message with a reserved bit that indicates the uplink indication information.

In an exemplary embodiment, the, the first sending module 110, the first receiving module 120, the determining module 130, the switching module 140, the second sending module 150, the third sending module 160, the second receiving module 210, the fourth sending module 220, the third receiving module 230, the fourth receiving module 240 and the fifth receiving module 250 can be implemented by one or more Central Processing units (CPUs), Graphics Processing Units (GPUs), Baseband Processors (BPs), Application Specific Integrated Circuits (ASICs), DSPs, Programmable Logic Devices (PLDs), Complex Programmable Logic Devices (CPLDs), Field-Programmable Gate Array (FPGAs), general processors, controllers, Micro Controller Units (MCUs), microprocessors or other electronic components, and can also be implemented in combination with one or more Radio Frequency (RF) antennas to implement the above method.

Figure 9:
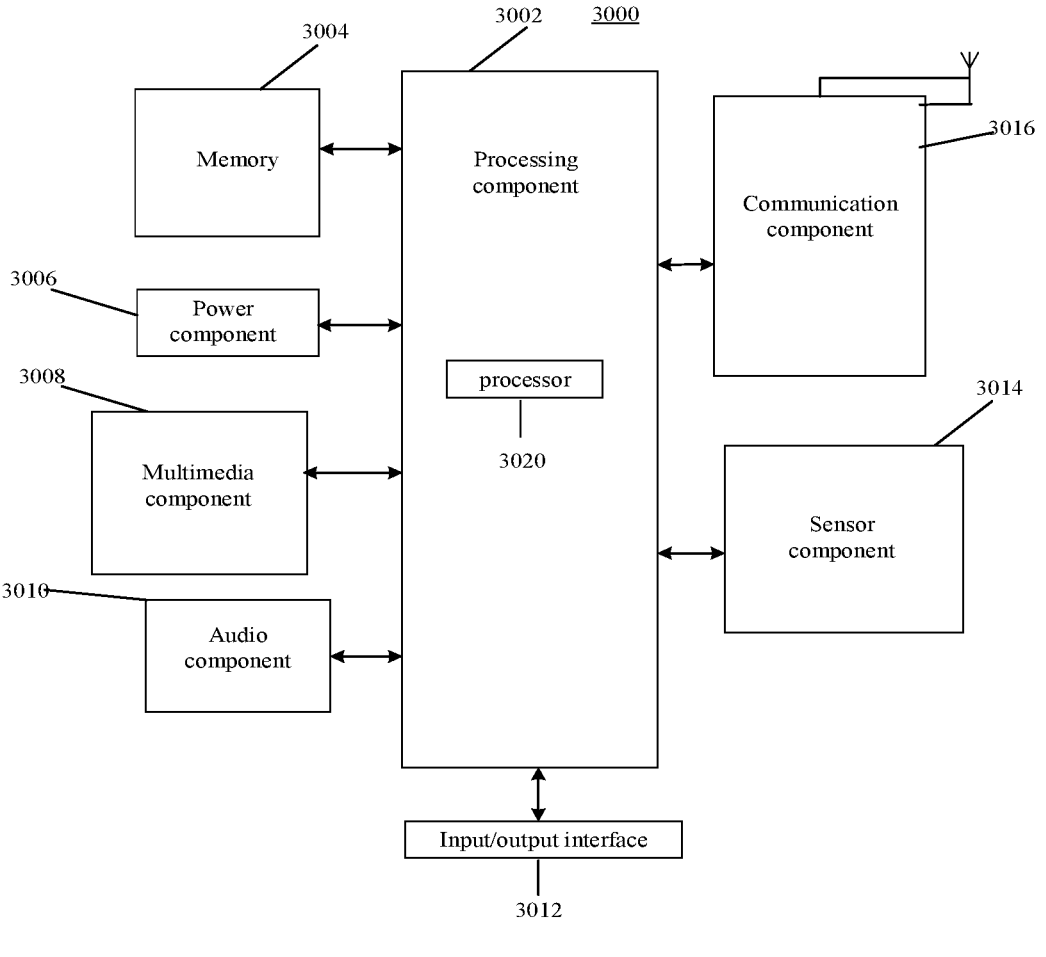
FIG. 9 is a block diagram of a device used for transmitting information according to an exemplary embodiment.

FIG. 9 is a block diagram of a device used for transmitting information 3000 according to an exemplary embodiment. For example, the device 3000 may be a mobile phone, a computer, a digital broadcasting terminal, a message transceiver device, a game console, a tablet device, a medical device, a fitness device and a personal digital assistant.

As illustrated in FIG. 9, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processor 3020 to perform all or part of the steps in the above described method. Moreover, the processing component 3002 may include one or more module which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensor to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In an exemplary embodiment, the communication component 3016 receives a broadcast signal or broadcast associated information from an external broadcast management system via a broadcast channel. In an exemplary embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including executable instructions, such as the memory 3004, executable by the processor 3020 in the device 3000, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting information, performed by an access network device, comprising:

sending uplink indication information, the uplink indication information being configured to instruct UEs in a non-connected state to send a first uplink signal;

receiving the first uplink signal sent by at least one of the UEs;

determining, based on the first uplink signal, a number of the UEs that sent the first uplink signal;

switching from a first operating mode to a second operating mode, in response to determining the number of the UEs that sent the first uplink signal being less than a threshold value; and switching from the second operating mode to the first operating mode, in response to determining the number of the UEs that sent the first uplink signal being greater than or equal to a threshold value, wherein a power consumption of the access network device in the first operating mode is greater than a power consumption of the access network device in the second operating mode;

wherein sending the uplink indication information comprises:

in response to the access network device being located in a preset area, sending the uplink indication information.

2. The method of claim 1, wherein receiving the first uplink signal sent by the at least one of the UEs in the non-connected state comprises:

receiving a message Msg1 in a random access process.

3. The method of claim 1, wherein sending the uplink indication information comprises at least one of:

broadcasting a system message carrying the uplink indication information;

sending Downlink Control Information DCI carrying a reserved-code short message indicating a reserved code that indicates the uplink indication information; or sending DCI carrying a reserved-bit short message with a reserved bit that indicates the uplink indication information.

4. The method of claim 1, wherein sending the uplink indication information comprises:

in response to the access network device not being connected to a UE in a connected state, sending the uplink indication information.

5. The method of claim 1, further comprising at least one of:

sending a signaling carrying a transmission resource configuration for the first uplink signal; or broadcasting a system message carrying the transmission resource configuration for the first uplink signal.

6. A non-transitory storage medium having executable programs for transmitting information stored thereon, wherein when the executable programs are executed, a processor of an access network device is caused to implement the method for transmitting information of claim 1.

7. A method for transmitting information, performed by a UE in a non-connected state, comprising:

receiving uplink indication information, the uplink indication information being configured to instruct the UE in the non-connected state to send a first uplink signal, wherein the uplink indication information is sent by an access network device in response to the access network device being located in a preset area; and in response to the uplink indication information, sending the first uplink signal; wherein the first uplink signal is received by the access network device to determine a number of UEs that sent the first uplink signal, to switch from a first operating mode to a second operating mode, in response to determining the number of the UEs that sent the first uplink signal being less than a threshold value; and to switch from the second operating mode to the first operating mode, in response to determining the number of the UEs that sent the first uplink signal being greater than or equal to a threshold value, wherein a power consumption of the access network device in the first operating mode is greater than a power consumption of the access network device in the second operating mode.

8. The method of claim 7, wherein sending the first uplink signal comprises: sending a message Msg1 in a random access process.

9. The method of claim 7, further comprising at least one of:

receiving a signaling carrying a transmission resource configuration for the first uplink signal; or receiving a system message carrying the transmission resource configuration for the first uplink signal;

wherein sending the first uplink signal comprises:

sending the first uplink signal on a transmission resource configured based on the transmission resource configuration.

10. The method of claim 7, wherein receiving the uplink indication information, comprises at least one of:

receiving a system message carrying the uplink indication information;

receiving Downlink Control Information DCI carrying a short message indicating a reserved code that indicates the uplink indication information; or receiving DCI carrying a short message with a reserved bit that indicates the uplink indication information.

11. A communication device, comprising:

a processor;

a memory coupled to the processor, wherein the memory stores executable programs for transmitting information, and when the executable programs are executed, the processor is caused to implement the method for transmitting information of claim 7.

12. A non-transitory storage medium having executable programs for transmitting information stored thereon, wherein when the executable programs are executed, a processor of a UE is caused to implement the method for transmitting information of claim 7.

13. A communication device, comprising:

a processor;

a memory coupled to the processor, wherein the memory stores executable programs for transmitting information, and when the executable programs are executed, the processor is caused to;

send an uplink indication information, the uplink indication information being configured to instruct UEs in a non-connected state within an access network to send a first uplink signal;

receive the first uplink signal sent by at least one of the UEs;

determine, based on the first uplink signal, a number of the UEs that sent the first uplink signal;

switch from a first operating mode to a second operating mode, in response to determining the number of the UEs that sent the first uplink signal being less than a threshold value; and switch from the second operating mode to the first operating mode, in response to determining the number of the UEs that sent the first uplink signal being greater than or equal to a threshold value, wherein a power consumption of the access network device in the first operating mode is greater than a power consumption of the access network device in the second operating mode;

wherein the processor is caused to send the uplink indication information by:

in response to the access network device being located in a preset area, sending the uplink indication information.

* * * * *